Oct. 6, 1925.  
A. FLETTNER  
PROPELLER  
Filed Feb. 28, 1922  
1,556,012  
4 Sheets-Sheet 1

Inventor
Anton Flettner by *[signature]*
Attorney.

Oct. 6, 1925.
A. FLETTNER
PROPELLER
Filed Feb. 28, 1922
1,556,012
4 Sheets-Sheet 2
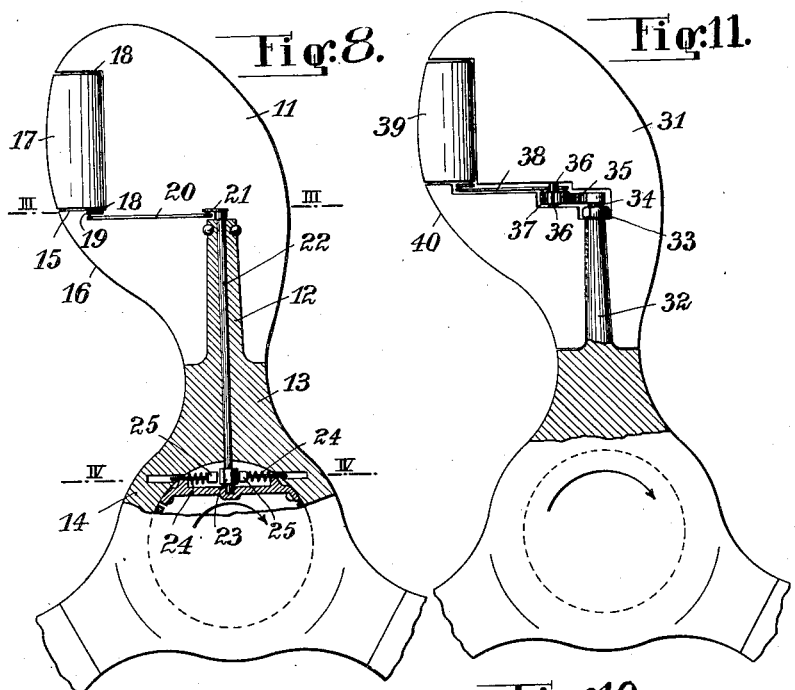
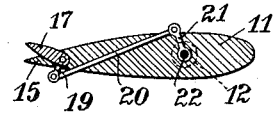
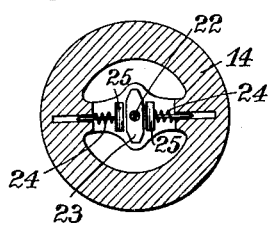
Inventor
Anton Flettner
by *[signature]*
Attorney.

Oct. 6, 1925.
A. FLETTNER
PROPELLER
Filed Feb. 28, 1922 4 Sheets-Sheet 3
1,556,012
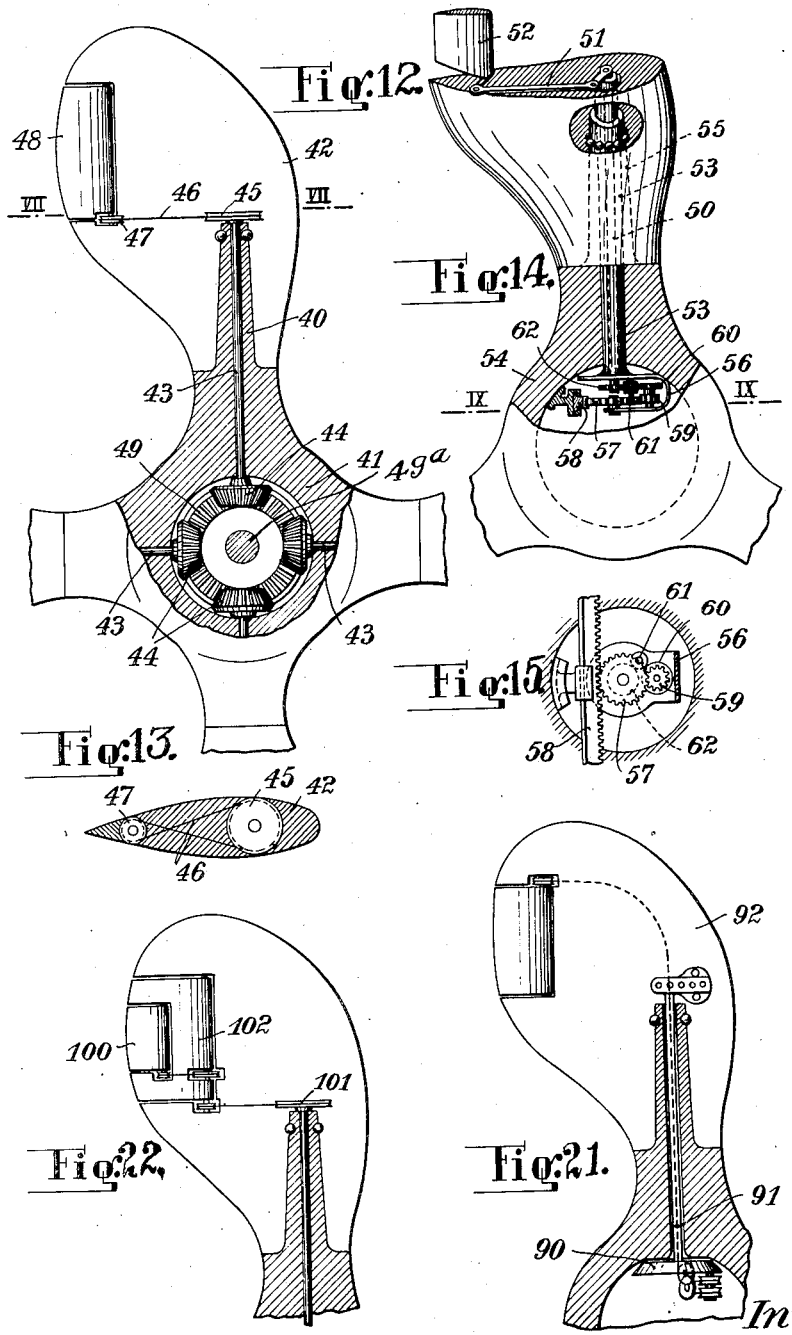
Inventor
Anton Flettner
by [signature]
Attorney.

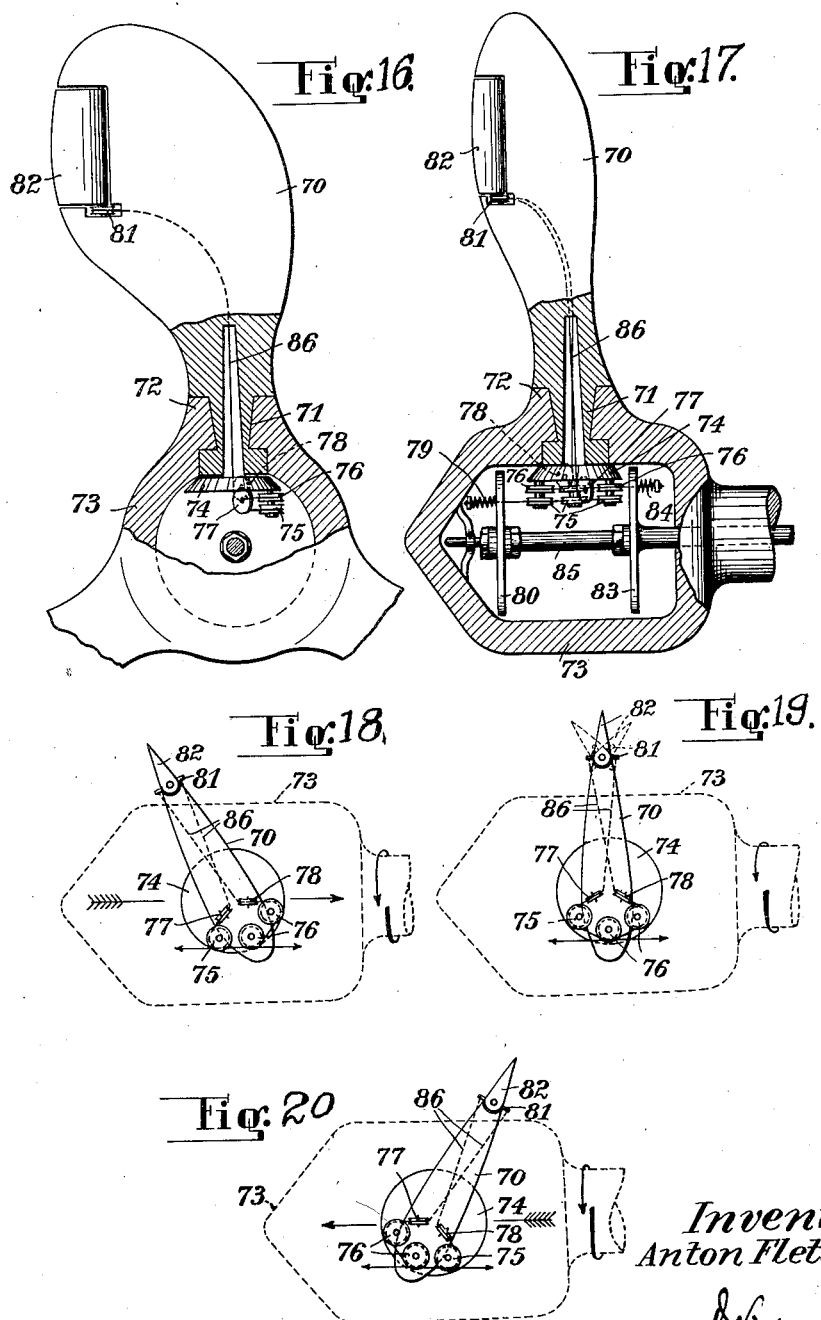

Patented Oct. 6, 1925.

1,556,012

UNITED STATES PATENT OFFICE.

ANTON FLETTNER, OF BERLIN, GERMANY.

PROPELLER.

Application filed February 28, 1922. Serial No. 540,008.

*To all whom it may concern:*

Be it known that I, ANTON FLETTNER, a citizen of Germany, residing at Berlin, Germany, have invented certain new and useful Improvements in Propellers (for which I have filed an application in Germany on March 9, 1921), of which the following is a specification.

My invention relates to the vanes or blades of screws, propellers, turbines, fan rotors, wind wheels, sails of wind mills and the like. It is an object of my invention to increase with the least possible expenditure of power the efficiency of such devices.

As is well known to those skilled in the art, in order to obtain maximum efficiency in screws or propellers for driving water craft, air craft or other vehicles or in screws serving to convert streaming energy into a rotary energy, as in power engines, or rotary energy into streaming energy, as in working machines, it is desirable to vary the angular position of the blades or vanes of the screw or propeller so as to adapt it to the conditions prevailing in each individual case, no matter whether and to what extent the direction of rotation or motion or the travelling velocity of the vehicle or the moving medium may vary. Such propellers as have hitherto been provided with adjustable blades are so designed, that the blades are rotatably arranged in the hub and as a rule have to be adjusted by means of a gearing extending through the hollow shaft of the propeller. This gearing has to take up the power transmitted in the form of a turning moment from the blade onto the shaft or vice versa. On the other hand it must be strong enough to resist the strains exerted by the streaming medium on the point where the blade is fixed to the hub. These mechanical conditions render the design of movable blades complicated. On the other hand a great expenditure of power is required for adjusting the blades, when the propeller is running.

It has already been proposed to employ propeller blades capable of turning freely and which will adjust themselves automatically under the influence of the current, so as to assume the most effective position. This result has been obtained either by giving the blades a suitable form or by causing the centrifugal force to act on the blades, so as to adjust them against the action of springs. It has further been proposed to supply the adjustable blades of lifting screws with a rigid covering surface or with surfaces pivoted to the shaft of the screw and serving for adjusting the screw blades. However, all these arrangements are purely automatic, the blades being only capable of assuming certain positions without being able to provide for emergencies resulting from altered conditions of flow or drive. Furthermore, all these arrangements involve the drawback that they do not allow of being operated by the attendant. In consequence thereof, none of these arrangements have been put to practical use.

It is an object of my invention to render the blades of screws, propellers or other rotors of this kind adjustable during working, while at the same time keeping extremely small the expenditure of power, required to act on the blade in order to adjust it and also the strains exerted on the blade by the medium wherein it is working.

My invention relates to arrangements of adjustable blades for rotors of the type defined, in which the current pressure acting on the blade is utilized for adjusting the blade. To this end I arrange, according to my invention, on the blade either at the entrance rim or at the discharge rim or else at some distance from these rims, a governing surface capable of moving relatively to the blade and together with the blade. In the majority of cases I have found it useful to arrange such governing surface near the discharge rim or at some distance therefrom, although it may in some cases be arranged with advantage at or near the opposite rim. If the governing surface is disposed at an angle to the blade surface, then no matter what position the blade assumes on the hub, the current flowing along the blade will exert on opposite sides of the blade different pressures differing from one another, which will turn the blade until it has adjusted itself in a position of equilibrium corresponding to the direction of rotation and to the number of revolutions of the screw in each individual case.

The governing surface can either adjust the blade automatically so that it assumes the position resulting in the highest efficiency for the time being, or the blade surface can be adjusted as desired by separate controlling means so as to adjust the blade or vane as required by the direction of rotation and the velocity of the rotor. In either case the end positions of the blade or vane may be determined by stops, or else the pressure of flow may be utilized for holding the blade or vane in the operative position required in each individual case.

By suitably choosing the size and configuration, cross section or angular position of the governing surface the blade or vane can be brought to adjust itself to the most favorable pitch for each variation of velocity which may arise during operation. By making variable any one of the said data, it is possible to vary the pitch of the screw in accordance with any desired rule of variation within the whole range of velocities for instance so as to increase or reduce the pitch uniformly or non-uniformly as the velocity increases, or in any other suitable manner.

In the drawings affixed to this specification and forming part thereof.

Figs. 1 to 7 are diagrams serving to illustrate in a general way the different means for carrying out my invention and the different ways in which they act, while Figs. 8 to 22 disclose several modifications of a ship propeller embodying my invention.

In the drawings—

Figs. 1 to 7 illustrate a rotor having a blade movably arranged thereon and a governing surface movably connected with such blade, the blade and the governing surface being shown in seven different positions according to the direction of rotation, of travel and of current, respectively.

Fig. 8 is an elevation, partly in section, of part of a propeller whose blades are provided with movable governing surfaces, Figs. 9 and 10 are sections on line III—III and IV—IV in Fig. 8, respectively, Fig. 11 is an elevation, partly in section of a propeller whose governing surface cooperates with a toothed sector and pinion, Fig. 12 is an elevation, partly in section, of a propeller whose governing surfaces are connected by aid of a rope drive with a direction governor, Fig. 13 is a section on line VII—VII in Fig. 12, Fig. 14 is an elevation, partly isometric and partly in section, of a propeller whose governing surfaces are connected with the direction governor through the medium of a rack and pinion, Fig. 15 is a section on line IX—IX in Fig. 14, Fig. 16 is an elevation, partly in section at right angles to the axis of the propeller shaft, and Fig. 17 is an elevation, partly in section in the axis of the propeller shaft, of a propeller in which the governing surfaces are connected with the direction governor by a rope drive, the entire operating gear being concealed in the hollow boss of the propeller.

Figs. 18 to 20 illustrate various positions of a blade and governing surface of the propeller illustrated in Figs. 16 and 17.

Fig. 21 is an elevation, partly in section, of a propeller in which the rope drive is partly inserted in a tube rigidly connecting the blade with the frame of the rope pulley gear, and Fig. 22 is an elevation, partly in section, of a blade provided with two governing surfaces.

Figures 1 to 4 disclose in a diagrammatic manner the rotor of a machine, which may be a propeller, or a screw, a turbine, a screw pump, a compressor or a wing wheel, a centrifugal pump, or some other machine which serves for converting the energy of a flowing medium into rotary energy, or rotary energy into propulsive motion of a vehicle or of the medium in which the rotor moves.

Figure 1:
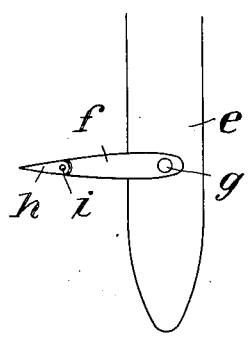
Figure 2:
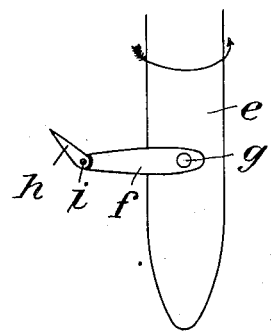
Figure 3:
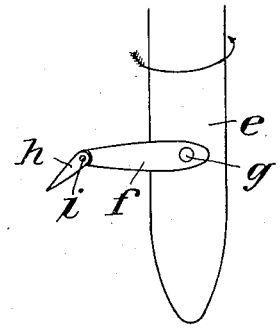

Referring first to Fig. 1, $e$ is a propeller shaft and $f$ is the blade movably arranged on its pin $g$. At the end of the blade the governing surface $h$ is arranged to be adjusted about a pin $i$ fixed to the blade. If now the governing surface is turned from the position of zero shown in Fig. 1, in one sense or the other (Figs. 2 and 3) and the shaft caused to rotate in the direction of the arrow, then the pressure exerted on the blade by the current will cause the blade to adjust itself in one or the other sense as disclosed in Figs. 4 and 5, respectively, which show that with the shaft permanently turning in one and the same direction the direction of travel which is indicated by the straight arrows can be changed in one or the other sense. With this arrangement it is possible for instance to reverse the direction of travel of the ship without changing the direction of rotation of the engines or of the shaft. In consequence thereof in turbine driven ships all reversing devices such as turbines for going astern, in electrically driven ships all switching devices for reversing the direction of rotation of the propeller motors can be dispensed with. All that is required are means for adjusting the governing surfaces, such means being subjected to insignificant strains only inasmuch as they have to transmit only the small forces required for adjusting the small governing surfaces. According to the angular adjustment of these small governing surfaces, the blades can be imparted the most advantageous angular position for each travelling speed. The conditions illustrated by Figs. 1 to 5 prevail as well in the case of propellers as of screw pumps. By suitably adjusting the governing surface the blade can be imparted the most favourable pitch for the number of rotations required in each case and by adjusting the blade to either side of a zero position at right angles to the shaft a change in the direction of travel or conveying can be obtained in one or the other sense without changing the direction of rotation.

Blades controlled by governing surfaces are useful not only in those cases where the power exerted on the screw shaft causes the shaft itself or else the medium surrounding the screw to move in one or the other direction. They are useful also in the case of turbines, wind wheels, wind sails and the like in which streaming energy shall be converted into rotating energy. Also in these cases the blade can be adjusted from its position of zero by means of the governing surface in such manner, that without changing the direction of the current the shaft will turn in one or the other sense.

Figure 6:
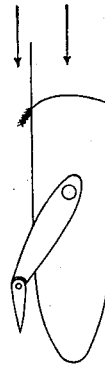
Figure 7:
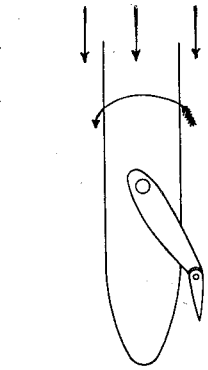

In the example illustrated in Figs. 6 and 7 the blade is swung about a position of zero longitudinally of the shaft in order to reverse the direction of rotation without changing the direction of the current. According to whether the governing surface be turned in one or the other sense, relatively to the blade assuming its position of zero, the blade is held by the current pressure in one or the other position and the screw will turn in one or the other sense, as shown by the curved arrows. If the blade is free to turn in a full circle and the means for adjusting the governing surface are so designed that this surface will not hinder the blade to turn round, the arrangement may be made such, that on the direction of the current being reversed, the blade as well as the governing surface will turn from the unstable position shown in Figs. 6 and 7 through about 180° into the stable position and will adjust themselves in this new position in the most favourable angular position according to the velocity prevailing in each individual case.

Figure 4:
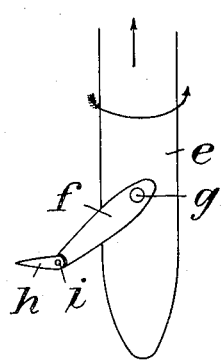
Figure 5:
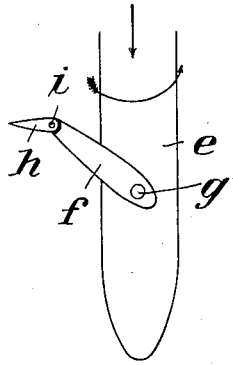

Similar conditions prevail in the case of the propeller illustrated in Figs. 1 to 5. In this case as well it is possible to cause the system, as the direction of rotation is reversed to adjust itself automatically into the new position. In all arrangements the gearing between the driving means for the governing surface and the blades (which may consist for instance of crossed rope drives or the like) are preferably designed in such manner that as the blade is adjusted by the governing surface, this latter is automatically carried back into the position of zero and is thus rendered operative as shown in Figs. 4 and 5 as compared with Figs. 2 and 3.

In the propeller illustrated in Figs. 8 to 10 the blades 11 are free to turn about spokes 12 extending from bases 13 formed on the hollow boss 14. The governing surface 17 is hinged on pins 18 extending in parallel with the axis of rotation of the blade and arranged in a recess 15 formed in the discharge rim 16 of the blade. An arm 19 is secured to the hinge pin 18, which is nearest to the boss 14, and connected with a crank arm 21 by a link 20. The crank arm is secured to a shaft 22 which extends through the hollow spoke 12 into the hollow boss 14. The arrangement of parts is such that the governing surface 17 stands at an angle to the blade 11 when this latter is in its zero position, that is, at right angles to the propeller shaft, so that the governing surface is capable of turning the blade into operative position when the propeller shaft begins to rotate. A stop block 23 is secured to the lower end of the spindle 12, which, when the blade is turned 180°, forces the pawls 25, pressed against it by springs 24, back so far that the governing surface 17 is free to turn through a predetermined angle when a one-sided pressure is exerted on it. The arm 19 and the crank 21 extend in opposite directions, as shown in Fig. 9.

When the direction of rotation of the propeller is reversed so that the discharge rim acts as the vane edge, the blade, which is now in a position of instability, is turned 180 degrees by the current into the position of stability and owing to the governing surface 17 being again correctly adjusted in consequence of the arrangement of its gear, is held in the correct angular position. In this new position the block 23 is again held in its position of rest by the pawls 25.

If an automatic adjustment of the main surface by means of the governing surface shall be obtained within a smaller angle, for instance in order to maintain the main surface in a preferred working position, an arrangement, such as shown in Fig. 11, can be used. The blade 31 is free to turn about the spoke 32 and is prevented from slipping off by a nut 33 on the end of the spoke. A toothed segment 35 keyed onto an axial extension 34 of the spoke 32 meshes with a gear 37 located on pins 36 in a recess of the blade 31 and connected with a governing surface 39 by means of a crank gear 38 similar to the one described with reference to Figs. 8 and 9. The governing surface 39 is pivoted in a recess of the blade at the discharge rim 40.

When the propeller rotates in the direction of the arrow, the pressure of the current acts on the governing surface and places it in the correct angular position in relation to the blade 31 which is thereby adjusted also in the correct angular position. While the blade 31 is being turned into this position, the gear wheel 37 is compelled by the crank gear 38 to roll on the segment 35, thereby causing a backward rotation of the governing surface 39. As soon, however, as a variation in the current tends to move the blade 31 out of its position of maximum efficiency, the governing surface 39 owing to the connection existing between the spoke 32 and the governing surface, is displaced angularly with regard to the blade, whereby a difference of pressure is again produced which causes the blade to return into its position of maximum efficiency.

As long as the propeller shall work only in one direction and it is only desired to automatically maintain the most favorable angular position within narrow angular limits this can be obtained by means of the segment 35 fixed to the spoke 32 which serves as direction governor and, consequently, forces the blade within given limits to assume a predetermined position which is determined by the conditions of working prevailing in each individual case.

If this direction governor be so designed as to be capable of assuming two diametrically opposite positions, the blade can be adjusted by aid of the direction governor, for both directions of rotation, in other words, it can be reversed. The reversing of the direction governor itself might be effected in a case of particular simplicity by manual engagement right at the place where it is secured to the blade, for instance by turning the block 23 (Fig. 8) together with the gearing 21, 20, blade 11 and governing surface 17 180° by hand, or by lifting the toothed segment 35 (Fig. 11) free of the spoke 32, turning, it 180° by hand together with the gearing 37, 38 and blades 31 and 39 and refastening it on the spoke for instance by means of the nut 33. As a rule however the reversing of the direction governor will be effected in the great majority of cases by suitable mechanism extending through the hollow propeller shaft.

In the devices above described the propeller shaft is reversed in order to reverse the ship, and the blades are turned accordingly through an angle of 180 degrees. The course of the ship may however, also be reversed by keeping the shaft rotating in the same direction and merely altering the position of the blades in relation to the shaft. In this latter case, the blade need merely be turned through an angle of about 45 degrees to one or the other side from its zero position in which its surface extends at right angles to the shaft.

Figs. 12 and 13 illustrate a simple device of this kind. A shaft 43 extends through the spoke 40 on the hollow boss 41 on which the blade 42 is free to turn. A bevel gear 44 is secured to the inner end of the shaft 43 and a rope pulley 45 to the outer end, this pulley being connected by a crossed rope 46 with a pulley 47 arranged on a pivot of the governing surface 48. By means of a large bevel gear 49 (the direction governor) which is keyed onto a spindle 49ª within the hollow boss 41 (the spindle being for instance controlled from the bridge of the ship) the bevel gears 44 and the rope pulleys 45 of all the blades are turned simultaneously and through equal angles.

By turning the direction governor out of its zero position to one side so adjusts the governing surface that at a given direction of rotation of the propeller shaft the governing surface will cause the blade to move into the correct angular position corresponding to the velocity prevailing at the time in one direction of travel, whereas by turning the direction governor from its zero position in opposite direction, with the propeller shaft rotating in the same direction as before, the governing surface will cause the blade to move into the position of maximum efficiency which corresponds to the velocity prevailing at the time in the opposite direction of travel.

If the governing surface is placed under pressure, its efficiency can be increased by inserting between the cog wheel 49 serving as direction governor and the governing surface a step-up gearing. In accordance therewith, the diameter of sheave 45 has been chosen considerably larger than that of sheave 47. This arrangement has the effect that already small deflections of the main surface 42, no matter whether they have been brought about purposely or whether they are merely accidental and are caused by disturbing influences of the flow, will result in a quick return or corrective movement of the governing surface 48.

In this device as well the governing surface is independent from the direction governor inasmuch as it automatically counteracts deviations of the blade from its correct position such deviations occurring for instance in consequence of temporary variations of the current, the governing surface being bodily rotated with the blade about the shaft 43 and being turned in opposite direction by the crossed rope, as it unwinds from the stationary pulley 45, so that the governing surface is carried into an angular position relatively to the blade whereby a difference of pressure is created between the front and the rear faces of the governing surface. This difference of pressure is balanced again by the turning back of the blade. This shows that the stationary direction governor does not in any way interfere with the self regulating action of the governing surface. According as the direction governor is displaced, it predetermines the angular position of the blade which corresponds to the maximum efficiency for the velocity prevailing at the moment. When the direction governor is turned through a predetermined angle, it causes the blades to be reversed into a diametrically opposite position, thus causing the ship to be propelled in opposite direction while the propeller shaft continues rotating in the same direction.

In Figs. 14 and 15 there is illustrated another device for reversing the direction of travel without reversing the propeller shaft. Here the rope shown in Figs. 12 and 13 is replaced by a crank gear and the step-up gearing is arranged within the boss. The spindle 50 of the crank gear 51, which acts on the governing surface 52, extends through a hollow spindle 53 inserted in the boss 54 and the spoke 55 and provided at its inner end with a U-shaped frame 56 carrying a train of gear wheels comprising a large wheel 57 meshing with a rack 58, intermediate wheels 59, 60, 61 and a direction governor wheel 62 on spindle 50. The manner in which the governing surface 52 is adjusted by means of the rack 58 which may be actuated by way of the hollow propeller shaft will be readily understood from the foregoing.

In the device illustrated in Figs. 16 to 20, the direction governor is connected with the governing surface by means of a rope drive as in the device illustrated in Figs. 12 and 13. However the entire mechanism is here arranged within the hollow boss and the ropes are guided in a particularly simple manner.

The movable blade 70 does not turn about a spoke, but is movably located by means of a flanged journal 71 in a projection 72 of the hollow boss 73. A disc 74 secured to the journal 71 within the boss 73 supports the rope gear, comprising six horizontal and two vertical sheaves. The horizontal sheaves 75, 76 are arranged in groups of three in two planes. Each one of the vertical sheaves 77, 78 leads the rope to one group of horizontal pulleys. One end of the rope is secured to a displaceable disc 80 and placed under tension by a spring 79. The rope runs over the lower groups of horizontal sheaves 75 and the vertical sheave 77 into the blade, around the sheave 81 fixed to a pin of the governing surface 82, then back through the blade and over the vertical sheave 78 and the other group of horizontal sheaves 76 to another disc 83 where its free end is secured to a spring 84. The discs 80, 83 are fixed on a rod 85 adapted to be moved axially in the hollow boss 73. The rope is guided in intersecting borings of the blade which, are preferably milled into the surface of the blade and then closed by a suitable cover after the ropes have been inserted.

Owing to the sheaves turning bodily with the blade, the rope can unwind therefrom so that, whenever the blade leaves its correct position, the governing surface is displaced automatically and counteracts the movement of the blade. On the other hand, by shifting the rod 85 and the discs 80 and 83 in one or the other direction, a pull is exerted on one or the other end of the rope, whereby the governing surface is caused to be adjusted in accordance with the velocity or turned in one or the other direction, as shown in Fig. 10 so as to reverse the blade and the direction of travel.

While the blade is being reversed, the governing surface owing to the rope unwinding from the sheave 81 will return to its zero position in relation to the blade.

If, as illustrated in Fig. 21, the frame 90 of the rope gear is rigidly connected with the pivoted blade 92 by a tube 91, thus causing the sheaves to turn with the blade, an automatic governing surface is obtained as in the case of the devices illustrated in Figs. 8 to 11, no automatic reversing action taking place. In this case, the blade is automatically turned through about 180 degrees when the direction of rotation of the propeller shaft is reversed, is then adjusted to a position corresponding to the velocity and maintained in this position by the governing surface.

In all the devices illustrated, each blade has been shown as provided with a single governing surface only. I may, however, provide several such governing surfaces for each blade acting either in parallel or in series. In Fig. 22, two governing surfaces 100 and 102 are shown arranged in series the smaller one (100) being adjusted by the direction governor 101 and on being turned through an angle, causing the larger surface 102 to turn also and to assume an angular position relatively to the blade which is thereby turned. Any undesired turning motion of the blade will be instantly counteracted by the smaller surface 100 causing the larger one to be deflected and to turn the blade back, as described above for blades having but a single surface.

The governing surfaces need not be arranged in a recess of the blade, as illustrated, but may be connected with the blade by levers. However, the arrangement shown and described is preferable inasmuch as it leaves the surface of the blade smooth. By making the discharge rim of the blade, or in the case of a plurality of governing surfaces being provided, of the larger surfaces sufficiently wide, the front edge of the governing surface can be prevented from projecting beyond the blade surface when the governing surface is being turned.

Instead of the gears illustrated crank gears, gear wheels and rope drives any other gears, and even hydraulic gearing may be provided.

In the devices illustrated in Figs. 16 to 20 the direction of travel or of conveying is reversed without changing the direction of rotation by turning the governing surface to one or the other side from a zero position at right angles to the shaft. If, on the other hand, it be desired to alter the direction of rotation without altering the direction of travel or of conveying, the blade instead of being caused to pass from a zero position at right angles to the shaft into the operative position, may be used to assume a zero position in parallel to the shaft.

The angle of deflection of the governing surface may be so chosen that the angular position of the propeller blade is increased or reduced at increasing velocity.

I am thus enabled to alter the direction of travel or of conveying by simply reversing the direction of rotation of the shaft or to reverse the direction of rotation by reversing the direction of the current, or else to alter the direction of travel or of conveying by adjusting the blade by means of the governing surface without altering the direction of rotation, and to impart to the blade the position of highest efficiency corresponding to the velocity prevailing at each moment.

My invention may be applied to propellers and rotors of any kind, as employed in connection with water or air craft (ships, air ships and flying machines) further to fans, compressors for air or water or any other materials, to conveyors and the like, and also to prime movers such as turbines, wind wheels and wind sails, for instance in wind mills.

I wish it to be understood that I do not desire to be limited to the exact details of construction shown and described, for obvious modifications will occur to a person skilled in the art.

I claim:

1. A rotor comprising in combination a blade loosely movable about an axis extending at an angle to the rotor axis and a governing surface movably connected with such blade for adjusting the blade under the action of current pressure.

2. A rotor comprising in combination a blade loosely movable about an axis extending at an angle to the rotor axis and a governing surface pivotally connected with such blade for adjusting the blade under the action of current pressure.

3. A rotor comprising in combination a blade loosely movable about an axis extending transversely to the rotor axis and a governing surface pivotally disposed near the discharge rim of such blade for adjusting the blade under the action of current pressure.

4. A rotor comprising in combination a blade loosely movable about an axis extending transversely to the rotor axis and a governing surface adjustably connected with such blade for adjusting the blade under the action of current pressure.

5. A rotor comprising in combination a blade loosely movable about an axis extending at an angle to the rotor axis, a governing surface connected with such blade for adjusting the blade under the action of current pressure and means adapted to be actuated at will for adjusting said governing surface relatively to said blade.

6. A rotor comprising in combination a blade loosely movable about an axis extending at an angle to the rotor axis, a governing surface connected with such blade for adjusting the blade under the action of current pressure, and means extending in the rotor axis for adjusting said governing surface relatively to said blade.

7. A rotor comprising in combination a blade loosely movable about an axis extending at an angle to the rotor axis, a governing surface connected with such blade for adjusting the blade under the action of current pressure and means extending in the rotor and the blade axes for adjusting said governing surface relatively to said blade.

8. A rotor comprising in combination a blade loosely movable about an axis extending at an angle to the rotor axis, a governing surface movably connected with such blade for adjusting the blade under the action of current pressure and a stop for limiting the movement of said surface.

9. A rotor comprising in combination a blade loosely movable about an axis extending at an angle to the rotor axis, a governing surface movably connected with such blade for adjusting the blade under the action of current pressure and a gear between said blade and said surface.

10. A rotor comprising in combination a blade loosely movable about an axis extending at an angle to the rotor axis, a governing surface movably connected with such blade for adjusting the blade under the action of current pressure and a geared transmission mechanism between said blade and said surface.

11. A rotor comprising in combination a blade loosely movable about an axis extending at an angle to the rotor axis, a governing surface movably connected with such blade for adjusting the blade under the action of current pressure and a gear between said blade and said surface, said gear being arranged to move about the axis of said blade.

12. A rotor comprising in combination a blade loosely movable about an axis extending at an angle to the rotor axis, a governing surface movably connected with such blade for adjusting the blade under the action of current pressure and a direction governor for said blade operatively connected with said surface.

13. A rotor comprising in combination, a rotor shaft, a blade loosely movable about an axis extending at an angle to the rotor axis, a governing surface movably connected with such blade for adjusting the blade under the action of current pressure and a direction governor for said blade disposed axially to said blade and operatively connected with said surface.

14. A rotor comprising in combination, a rotor shaft, a blade loosely movable about an axis extending at an angle to the rotor axis, a governing surface movably connected with such blade for adjusting the blade under the action of current pressure, a direction governor for said blade fixed relatively to said shaft and operatively connected with said surface and means extending axially through said shaft and said blade for adjusting said surface.

15. A rotor comprising in combination a blade loosely movable about an axis extending at an angle to the rotor axis and a plurality of governing surfaces connected with such blade for adjusting the blade under the action of current pressure.

16. A rotor comprising in combination a blade loosely movable about an axis extending at an angle to the rotor axis and a plurality of governing surfaces disposed in series and connected with such blade for adjusting the blade under the action of current pressure.

17. A rotor comprising in combination a blade loosely movable about an axis extending at an angle to the rotor axis, a governing surface movably connected with such blade for adjusting the blade under the action of current pressure, a direction governor for said blade operatively connected with said surface and a step-up gearing between said surface and said governor.

18. A rotor comprising in combination a blade loosely movable about an axis extending at an angle to the rotor axis, a plurality of governing surfaces disposed in series and connected with such blade for adjusting the blade under the action of current pressure and a direction governor for each governing surface with the exception of the last surface.

19. A rotor comprising in combination a blade loosely movable about an axis extending at an angle to the rotor axis, a plurality of governing surfaces disposed in series and movably connected with such blade for adjusting the blade under the action of current pressure and a direction governor for said blade operatively connected with said surfaces and a gearing between said direction governor and the last surface which gradually increases towards said surface.

20. A rotor comprising in combination, a rotor shaft, an arm on said shaft, extending at an angle thereto, a blade loosely movable about said arm and provided with a recess for fixing it on said arm and a governing surface connected with such blade for adjusting the blade under the action of current pressure.

21. A rotor comprising in combination, a rotor shaft, an arm on said shaft, extending at an angle thereto, a blade loosely movable about said arm, a direction governor for said blade, disposed near the outer end of said arm and a governing surface movably connected with said blade for adjusting said blade under the action of current pressure.

22. A rotor comprising in combination a blade loosely movable about an axis extending at an angle to the rotor axis and a governing surface pivotally disposed in a recess of said blade for adjusting the blade under the action of current pressure.

23. A rotor comprising in combination, a blade loosely movable about an axis extending at an angle to the rotor axis, a governing surface movably connected with such blade for adjusting the blade under the action of current pressure and a gear between said blade and said surface, said surface and said gear being arranged in such manner as to be capable of carrying said surface back into zero position whenever said blade is adjusted.

24. A rotor comprising in combination a blade loosely movable about an axis extending at an angle to the rotor axis, a governing surface movably connected with such blade for adjusting the blade under the action of current pressure and a gear between said blade and said surface, said surface and said gear being arranged in such manner as to be capable of automatically causing said surface, whenever said blade is deflected accidentally by the current, to be set at such an angle to said blade as to counteract said deflection.

In testimony whereof I affix my signature.

ANTON FLETTNER.